May 23, 1961  E. R. HEFFELFINGER  2,985,053
RHYTHM RECORDER
Filed Oct. 6, 1955  2 Sheets-Sheet 1

INVENTOR.
EUGENE R. HEFFELFINGER
BY
*Hearman & Hearman*
ATTORNEYS

May 23, 1961 E. R. HEFFELFINGER 2,985,053
RHYTHM RECORDER

Filed Oct. 6, 1955 2 Sheets-Sheet 2

*INVENTOR.*
EUGENE R. HEFFELFINGER

BY *Fearman & Fearman*

ATTORNEYS

United States Patent Office 2,985,053
Patented May 23, 1961

2,985,053
RHYTHM RECORDER
Eugene R. Heffelfinger, 958 Day Road, Vassar, Mich.
Filed Oct. 6, 1955, Ser. No. 538,947
9 Claims. (Cl. 84—463)

This invention relates to instruction aids and more particularly to a rhythm recorder for use by music teachers, students, and others.

As music teachers and trained musicians well know, it is extremely difficult for a student to acquire the ability to read rhythmic patterns in a musical composition or exercise and almost simultaneously produce or interpret them in the music played. The ability to produce or interpret the rhythmic patterns intended by the composer is only obtained after long and painstaking practice under the supervision of a well trained teacher. Frequently students miss or fail to fully comprehend this very important phase of their musical education because there is no reliable way to achieve proper rhythmic patterns while practicing new material unless the student is under the constant scrutiny of the instructor. Further, because the sense of hearing of most students does not seem to be attuned to distinguishing rhythmic patterns and students tend to be much less interested in developing this faculty, and because, without a visual record to follow, the progress made is difficult to evaluate and grading is impractical, many students never learn to properly play the rhythm intended by the composer.

One of the principal objects of the instant invention is to transform the rhythmic patterns produced by the student into a visual record which can be compared with other visual records produced by highly skilled performers and instructors.

Broadly the invention comprises a writing instrument for transcribing a record on paper or the like which is actuated by means capable of moving the instrument in accordance with the intensity and duration of the movement or force producing a given note of music.

Another object of the invention is to provide means such as a bellows or another pressure transmitting element connected between the instrument and a pressure fluid source which expands and contracts the bellows or equivalent elements in accordance with the rhythmic patterns produced by the student.

A further object of the invention is to provide a rhythm recording device which can be used in multifarious ways to perfect the student's style, his interpretive ability, his touch, and his pedal technique.

Another object of the invention is to provide a rhythm recorder which permits the student to perfect these techniques far more rapidly than previously.

A further object of the invention is to provide apparatus of the type described which graphically depicts rhythm patterns so that an analysis of the various rhythm components can be conducted and imperfections can be detected and traced.

Another object of the invention is to provide a rhythm recorder which permits the visual comparison of the rhythm patterns produced and produces a permanent record permitting classification and grading.

A further object of the invention is to provide apparatus of the character described which permits a number of students to be taught rhythm in a class or seminar.

A still further object of the invention is to provide a recorder of simple and practical design which can be very economically manufactured and assembled.

With the above and other objects in view, the present invention consists in the combination and arrangement of parts hereinafter more fully described, illustrated in the accompanying drawing, and more particularly pointed out in the appended claims, it being understood that equivalent changes may be made in the various elements which comprise the invention without departing from the spirit thereof or the scope of the appended claims.

Figure 1:
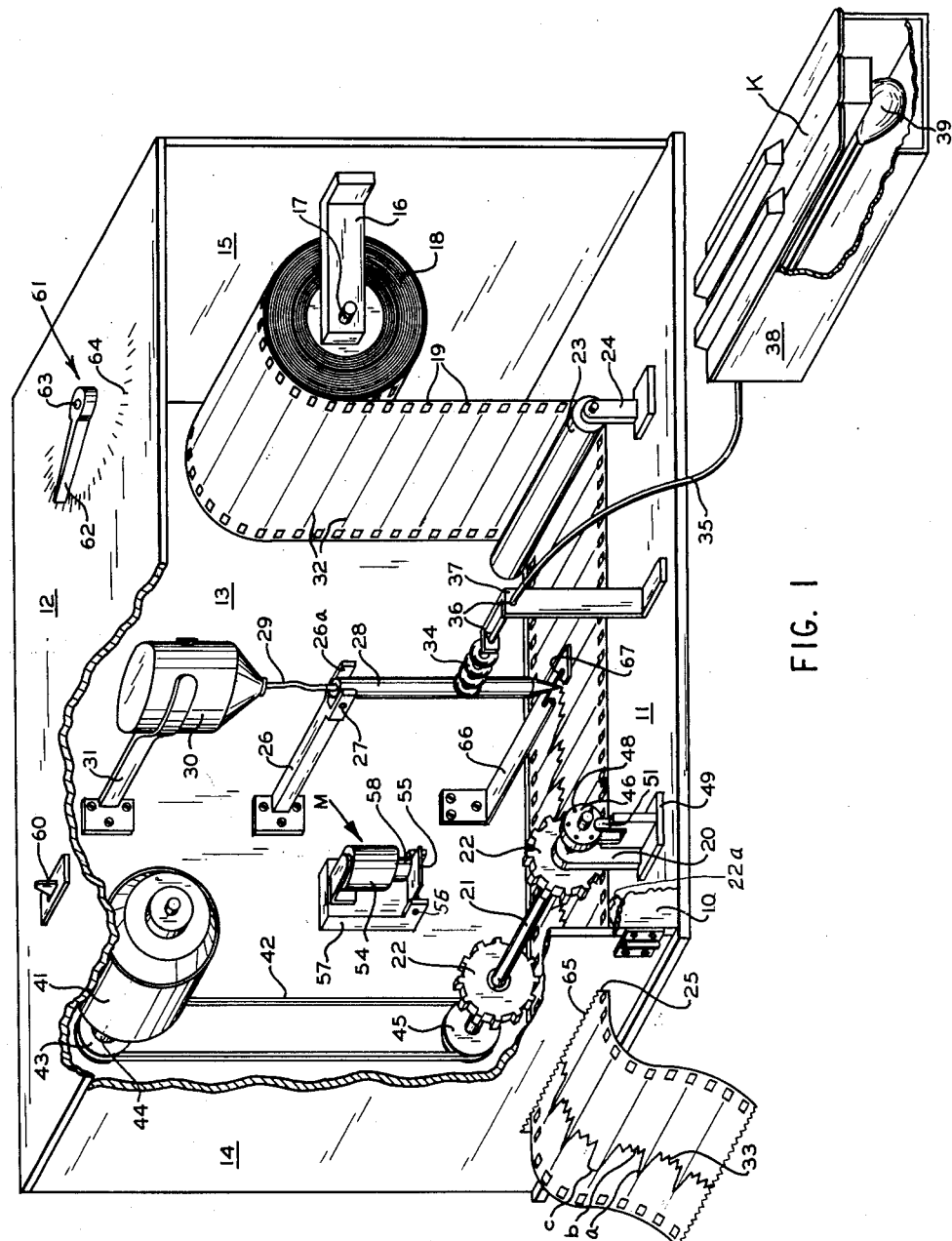
Fig. 1 is a perspective, elevational view of my rhythm recorder with portions of the various housing walls broken away to disclose the elements therein.

Referring now more particularly to the accompanying drawings wherein I have shown a preferred embodiment of my invention, a letter C generally indicates a rectilinear casing or housing which can be provided with a hinged side panel or wall 10 permitting access to the interior thereof. The shape and size of the casing are unimportant to the invention, however for convenience sake the casing will be described as having, also, a floor 11, a top 12, an opposite side wall 13, and front and rear end walls 14 and 15.

Mounted on the rear wall 15 are brackets 16 which support a shaft 17 and revolvable on shaft 17 is a roll or spool of paper tape or film-like strip material 18 which is provided with longitudinally spaced apart edge perforations 19. Bearings 20 support a sprocket shaft 21 adjacent the front end wall 14 below the roll 18 and sprockets 22 which engage in the perforations 19 pull the paper tape from the roll at the rate of speed desired, as will be later explained. The leading end of the tape 18 passes from the roll down under a revolvable idler roller 23, which is supported on bearings 24, and thence leads past the motivating sprockets or spur wheels 22 out a slot 25 in the front end wall 14 of the housing. Idler sprockets 22a or the like could, of course, be provided under the strip 18 in front of sprockets 22 if necessary to hold the strip in engagement with sprockets 22.

Figure 3:
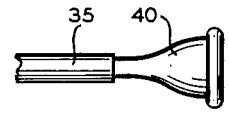
Fig. 3 is a fragmentary view showing a conventional mouthpiece fixed to the end of the air tube in place of the compressible bulb shown in Fig. 1.
Figure 6:
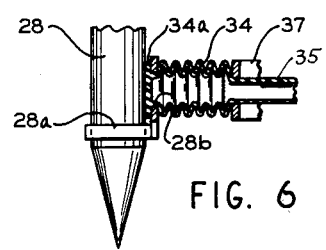
Fig. 6 is an enlarged fragmentary view showing the manner in which the actuating bellows is secured to the marker or pen.

Supported on the wall 13 is a pen guide 26 including a yoke end 26a having trunnions 27 for pivotally supporting a pen 28. The pen 28 could be of conventional ball point design or may be a fountain type which is continuously fed ink through a tube 29 leading from an inverted bottle 30 supported above the pen by a bracket 31. The point of the pen is, of course, in engagement with the recording strip 18 which may be conveniently subdivided by metronone lines 32. In order to move the pen 28 about its pivots 27 to transcribe rhythm on the strip 18 as at 33 one end of an expansible hollow rubber bellows 34 is secured to the pen 28. A clip 28a having an arm with an opening 28b therethrough is mounted on the pen as shown and the end node 34a of the bellows which is of greater diameter than the opening 28b is forced therethrough so that its end wall engages the pen. A flexible tube 35 leads from the interior of the bellows 34 opposite the pen and as shown the tube extends through openings 36 in a bracket 37 supported on floor 11 and leads to a keyboard housing 38. Provided within the housing 38 on the outer end of tube 35 is a rubber bulb 39 or the like which is positioned under the depressible key K. Alternatively a mouth piece 40 (see Fig. 3) could be provided on the outer end of tube 35 so that a wind instrument musician blowing thereinto in the simulated playing of a particular piece of music could record the rhythmic pattern produced. While the wind musician could learn to play in rhythm by striking the key K there are advantages in recording the actual blowing since style is to be considered.

A motor 41 is provided to drive the sprocket shaft 21 through the medium of a belt 42 which is trained around a pulley 43 on the armature shaft 44 of the motor and a pulley 45 on the shaft 21.

Figure 5:
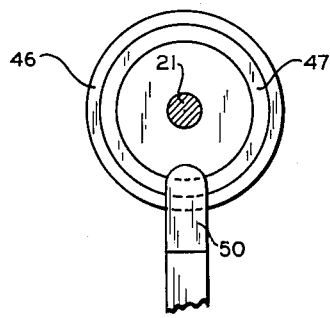
Fig. 5 is a side elevational view of the contact wheel for operating a metronome in timed relation with the travel of the recording strip.

As the sprockets 22 revolve a metronome M is intermittently energized in a manner which will now be described so that it clicks at the precise moment the pen 28 crosses each line 32. Mounted on shaft 22 is a contact wheel 46 which is provided with a continuous annular contact 47 on one side thereof (see Fig. 5) and a series of circumferentially spaced contacts 48 on the other side thereof (see Fig. 1). The wheel 46 is, of course, formed of an insulative material so that the contacts 47 and 48 are electrically separated. Spaced arms on a block 49 have contact plates 50 and 51 thereon as shown, the contact plate 50 being continuously in engagement with the contact 47 while the contact plate 51 is only intermittently in engagement with the contacts 48 as the wheel 46 revolves.

Figure 2:
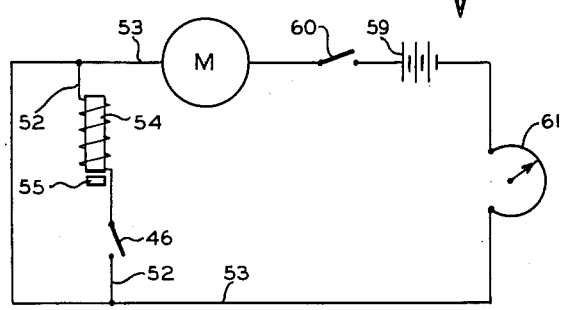
Fig. 2 is a circuit diagram schematically depicting the circuits in the recorder.

The circuit wires 52 (see Fig. 2) which lead from the contact plates 50 and 51 and are shown connected in parallel with the motor circuit wires 53 are adapted to energize an electromagnet or solenoid 54 which attracts an armature plate 55. The plate 55 is pivotally mounted on shafts or trunnions 56 provided on the angular metronome bracket 57 and, when pulled toward the solenoid 54, strikes the core 58 so that an audible click is heard.

Provided in the motor circuit 53 is a plug 59 which may be connectional to a power source, an off-on line switch 60, and a rheostat 61. By adjusting an indicator pointer 62 on the rheostat actuating shaft 63 in accordance with a scale 64 on the casing more or less resistance is thrown into the motor circuit 53 and the speed of motor 41 and accordingly the rate of feed of tape 18 can be varied.

When desirable a strip may be torn from the roll 18, the serrated edge 65 being provided on the upper edge of slot or opening 25 for this purpose. In many cases however it will be possible to use a roll 18 for a second and third time by simply changing the color of ink used. Suitable manual or mechanical rewind mechanism can be provided to facilitate reuse or partial reuse of the roll and means could also be provided for moving the tape 18 transversely so that the pen 28 would engage it at a different point.

A pen guide 66 fixed to the wall 13 has a slot 67 therein to pass the point of the pen and positively prevent any lateral movement thereof and obviously the point of the pen must extend below the guide a slight distance. The guide 66 assures that movement of the pen will be in a vertical plane only.

In operation the pointer 62 is adjusted to feed the paper 18 at a speed whereby it conforms to the standard metronome lines on the strip. As noted the speed of the paper is adjusted so that the pen 28 crosses a line 32 every time the hinge plate 55 is brought into audible engagement with the core 58 a given number of times per minute. When the key K is depressed the bulb 39 is, of course, compressed and the air therein passes into tube 35 and expands the flexible rubber bellows 34 lengthwise or axially to push the point of the pen 28 outwardly. If the key is struck a fairly hard blow with considerable accent, the air impulse is transmitted to the bellows accordingly and the pen is moved rapidly forwardly a considerable distance from its normal position as at "a," while if the key is struck with little accent or intensity the pen will be moved a relatively slight distance as at "b." The resilient bellows 34 returns the pen to original position as soon as the air is restored to bulb 39 and, of course, the duration of the note is graphically represented by the delay in the return (at "c"). If the note is not struck sharply enough or is not struck at the proper time obviously the graph will portray these faults. The bellows 34 is employed because it is extremely sensitive to air impulses or pressure variations and is actuated by relatively slight impulses as well as heavier impulses. Preferably the fluid within the bellows is at a pressure a few pounds per square inch less than atmospheric pressure which makes the bellows more sensitive and tends to permit it to act more rapidly.

The apparatus may be used in a number of ways. If a lesson book has been prepared with the notes in a rhythm pattern and a correct graphic representation such as produced by the device underneath or above them, the student can read the rhythm pattern according to the note arrangement and then, using a conventional counting system, proceed to play the rhythm on the key 39. If the graphic pattern produced by the student is compared with the correct graphic pattern in the lesson book any dissimilarities can be noted and the student can practice in this manner until he or she is able to produce a graphic pattern identical with that in the lesson book.

More advanced students who are being taught to capture the style and maturity of the music they play may not be directed to exactly copy the graphic patterns of master performers but may be directed to incorporate various tempo changes into their playing in accordance with their interpretation of the rhythm of the composition. If the teacher will transcribe her own variations or "rubato" on an unlined strip 18 and the student does likewise the graphic representations may be compared.

Further the graph will as noted, indicate when the various degrees of intensity have been felt by the performer and will report the duration of the individual tones so that rhythm imperfections can be traced and the faults corrected. Good rhythmic playing, of course, depends on stubtle intensity changes and "style," which is dependent upon the duration of individual tones. The placement of accents and the intensity desired varies with the type of music being played and some songs require smooth connected tones of relatively long duration while other music such as marches, for example, need sharp detached notes in various passages (staccato) and sustained notes in others. Obviously with the instant apparatus difficulties encountered when accents are misplaced or not apparent enough, or when the tones are not of the proper duration, may be readily detected and corrected. The device is particularly helpful in the development of style for which there are no set formulas or well defined standards, since good and bad performances can be compared. Further the apparatus will aid the piano student in developing his or her "touch" since the graph will show split second variations in the release of the key K.

Figure 4:
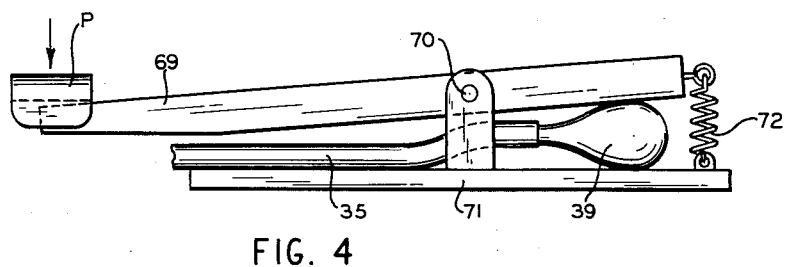
Fig. 4 shows a further modification of the invention in which the bulb of Fig. 1 is intermittently released from a state of compresson by the foot pedal of a piano to record a student's pedal patterns.

In Fig. 4 I have shown a slightly modified embodiment of the invention in which a lever arm 69 which is pivotally supported at 70 on a platform 71 is positioned under the outer end of a standard piano foot pedal P. The bulb 39 instead of being disposed in a keyboard housing is arranged under the outer end of lever arm 69 and is normally compressed, the spring 72 holding the said end of lever 69 down when there is no pressure on the pedal P. In this case the impulse is recorded just before each beat when the foot pressure is released whereas in the previously described transcriptions the impulses were recorded simultaneously with the beat or shortly thereafter. Thus the device obviously can be used in still another manner to develop the student's "pedal technique." Of course, the strip 18 is disengaged from the sprockets 22 the device may be used as a conventional metronome.

It should be apparent that I have perfected a very practical rhythm recorder which will be widely adopted by music teachers, students, and accomplished musicians as well.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

For example the strip could remain at rest in another embodiment of the invention while the motor was employed to move the pen in timed relation thereto to trace a rhythm pattern thereon.

Where the term "simulated musical rhythm reception member" is used in the claims the meaning is that the member is the same as the reception part of an instrument such as the key of a piano keyboard but it is not intended to imply that the key or the like produces any musical sound.

I claim:

1. In a simulated musical rhythm transcriber; a relatively movable transcriber strip and transcribing element for marking the same positioned in engagement therewith; means connected to and moving one of the strip and transcribing element in a generally planar path of travel relative to the other; means supporting one of the strip and transcribing element for movement in a plane transverse to the said planar path of travel of the other; a simulated musical rhythm reception member; a fluid pressure system connected responsively to said member to vary the pressure of the fluid therein and create a series of fluid pressure impulses of varying duration, frequency, and intensity; and fluid pressure translating means connected between said fluid pressure system and said one of the strip and element supported for movement and translating the pressure of said system into mechanical movement of said one of said strip and element to transcribe rhythm on the strip graphically.

2. The combination defined in claim 1 in which said musical rhythm reception member comprises a depressible simulated piano key and a compressible fluid filled bulb thereunder connected in said fluid pressure system and compressed on depression of said key to create said impulses.

3. The combination defined in claim 1 in which said musical rhythm reception member comprises a lever pivotally mounted intermediate its ends and having one end disposed under the foot pedal of a piano so as to be actuated by the same, a compressible fluid filled bulb connected in said fluid pressure system is provided under the opposite end of said lever, and a spring normally holds said opposite end of the lever down and said bulb accordingly compressed until said pedal is depressed and the lever is pivoted to raise its said opposite end.

4. The combination defined in claim 1 in which said fluid pressure translating means comprises an expansible, resilient bellows which automatically returns to original position.

5. The combination defined in claim 1 in which said strip has edge perforations therein, motor means, a sprocket shaft connected to said motor means, sprockets thereon engaged in the perforations for driving the strip, a metronome, a metronome circuit, contact means in said circuit on said shaft, and contact means intermittently engaging the contact means on said shaft for intermittently operating the metronome in timed relation with the feed of the strip.

6. The combination defined in claim 1 in which a housing is provided and said marker comprises a pen pivotal at its upper end to swing in a transverse plane, and guide means extending from said housing to positively limit the swing to a vertical plane only.

7. The combination defined in claim 1 in which said strip has longitudinally spaced metronome marks; intermittent sound creating means; and means actuated by the travel of said strip for energizing said sound creating means intermittently when said marker crosses one of said metronome marks.

8. In a rhythm recorder, a longitudinally disposed recorder housing including, opposite end walls, a strip roll having edge perforations revolvably supported on one end wall thereof, the opposite end wall having a slot therein below said roll passing the leading end of said strip, an idler roller below said strip roll and under which the leading end of said strip passes, a sprocket shaft spanning the leading end of said strip near the slot in said wall, sprockets thereon engaged in the perforations in the strip to move the strip longitudinally, a motor driving said sprocket shaft at a controlled rate of speed, a pen pivotally supported above said strip between the sprockets and roll with its point in engagement with the strip, guide means positively preventing the pen point from moving except in a vertical plane transverse to the direction of travel of said strip, a key housing having a depressible key mounted therein, a compressible rubber bulb under said key, an expansible, collapsible hollow rubber bellows connected to said pen parallel to the said guide means, a bracket in said housing having a wall perpendicular to the axis of the bellows and against which the one end of said bellows braces, said wall of the bracket having an opening in axial alignment with the bellows, a flexible rubber tube passing through said opening into said bellows at one end and connected to said bulb at its opposite end, a motor circuit including a connection to a power source, a metronome in said recorder housing, a metronome circuit in parallel with said motor circuit, a wheel on said sprocket shaft having a continuous annular contact on one side electrically separated from a series of circumferentially spaced contacts on the other side, and a pair of contacts in said metronome circuit, one in engagement with said continuous contact and the other in intermittent engagement with said spaced contacts as the wheel revolves.

9. The combination defined in claim 8 in which said motor circuit has a rheostat therein, a speed scale on said housing, and an indicator pointer for said rheostat indicating the speed of travel of the strip according to said scale.

References Cited in the file of this patent

UNITED STATES PATENTS

| 202,433 | Gobel | Apr. 16, 1878 |
| 630,272 | Swenson | Aug. 1, 1899 |
| 992,010 | Lanphier | May 9, 1911 |
| 1,074,556 | Meahl | Sept. 30, 1913 |
| 2,006,882 | Cleveland et al. | July 2, 1935 |
| 2,139,384 | Schamehorn | Dec. 6, 1938 |
| 2,234,948 | Allen et al. | Mar. 18, 1941 |
| 2,702,369 | Dreyfus | Feb. 15, 1955 |
| 2,709,430 | Trangott | May 31, 1955 |